3,198,775
COPOLYMERS HAVING IMPROVED OPTICAL
CLARITY
Richard Emile Delacretaz, Speros Peter Nemphos, and
Robert Louis Walter, Springfield, Mass., assignors to
Monsanto Company, a corporation of Delaware
No Drawing. Filed Mar. 30, 1962, Ser. No. 183,772
10 Claims. (Cl. 260—85.5)

This application is a continuation in part of our co-pending application S.N. 67,466, filed November 7, 1960, now abandoned.

This invention relates to suspension-polymerized styrene-acrylonitrile type copolymers. More particularly, the invention relates to a process for preparing suspension-polymerized styrene-acrylonitrile type copolymers having improved optical clarity.

Suspension polymerization techniques have been advantageously employed in the preparation of styrene-acrylonitrile type copolymers in bead form. However, known suspension polymerization techniques have the disadvantage of producing styrene-acrylonitrile type copolymers exhibiting a high haze level, which is objectionable in molding, film, and sheet applications wherein optical clarity is required or desired.

One object of this invention is to provide suspension-polymerized styrene-acrylonitrile type copolymers having improved optical clarity.

Another object is to provide a process for preparing suspension-polymerized styrene-acrylonitrile type copolymers having improved optical clarity.

These and other objects are attained by copolymerizing at least one monovinylidene aromatic hydrocarbon and an unsaturated nitrile of the group consisting of acrylonitrile, methacrylonitrile, and mixtures thereof by a modified aqueous suspension polymerization technique wherein (1) copolymerization is initiated in the absence of a suspending agent, (2) a water-soluble suspending agent is added to the reaction mixture at a stage of the reaction between 20 and 40% conversion of monomers to polymer, (3) a water-soluble inorganic salt is added to the reaction mixture prior to the stage of 65% conversion, (4) the monomer ratio in the reaction mixture is maintained substantially constant by adding supplemental amounts of the more rapidly-consumed monomer between 30 and 95% conversion, (5) the copolymerization reaction is terminated at 95–98% conversion, and (6) unreacted monomers are then removed by distillation.

The following examples are given to illustrate the invention. Unless otherwise specified, parts and precentages mentioned are parts and percentages by weight.

EXAMPLE I

A suitable reaction vessel is charged with 100 parts of water, 60 parts of styrene, 30 parts of acrylonitrile, 0.1 part of t-dodecyl mercaptan, 0.25 part of sodium chloride, 0.03 part of di-t-butyl peroxide, and 0.1 part of di-t-butyl-p-cresol. This charge is deoxygenated by boiling in an inert atmosphere and then heated with agitation under inert gas pressure to polymerize the monomers at a time-temperature cycle of 2 hours at 118° C., 2 hours at 125° C., 3 hours at 135° C., and 2 hours at 145° C. During the polymerization reaction, the following additions are made to the reaction mixture:

(1) At 26% conversion—3 parts of a 1% aqueous solution of an acrylic acid-2-ethylhexyl acrylate copolymer having a combined acrylic acid content of 93.5–98.5 mol percent, (2) Between 40 and 90% conversion—10 parts of styrene added continuously, (3) At 40% conversion—0.1 part of t-dodecyl mercaptan, and (4) At 60% conversion—0.1 part of t-dodecyl mercaptan.

Polymerization is terminated at 98% conversion. Unreacted monomers are distilled from the product, which is then cooled, dewatered, washed, and dried. The styrene-acrylonitrile copolymer has a haze level of 5%.

In this and in the succeeding examples, the styrene-acrylonitrile type copolymers are tested for haze by pelletizing the copolymer beads on an extruder at 400° F., compression molding the pellets at 400° F. to form a ⅛"-thick slab, measuring the total transmittance ($T_t$) and diffuse transmittance ($T_d$) through the slab of light having a wave length of 550 mu, and calculating the haze in accordance with the equation:

$$\text{Haze} = \frac{T_d \times 100}{T_t}$$

EXAMPLE II

Example I is repeated with the exception that the 10 parts of styrene added to the reaction mixture between 40 and 90% conversion are added as 5 slugs, each consisting of 2 parts of styrene, at regular intervals between 40 and 90% conversion rather than continuously. The copolymer has a haze level of 5%.

EXAMPLE III

A suitable reaction vessel is charged with 100 parts of water, 50 parts of styrene, 10 parts of alpha-methyl styrene, 30 parts of acrylonitrile, 0.25 part of sodium chloride, 0.6 part of lauroyl peroxide, 0.04 part of t-butyl peracetate, and 0.1 part of di-t-butyl-p-cresol. This charge is deoxygenated by boiling in an inert atmosphere and then heated with agitation under inert gas pressure at 80° C. for 3 hours and at 120° C. for the next 3 hours. During the polymerization reaction, the following additions are made to the reaction mixture:

(1) At 30% conversion—3 parts of a 1% aqueous solution of an acrylic acid-2-ethylhexyl acrylate copolymer having a combined acrylic acid content of 93.5–98.5 mol percent, and (2) Between 40 and 90% conversion—10 parts of styrene added continuously.

Polymerization is terminated at about 97.5% conversion. Unreacted monomers are distilled from the product, which is then cooled, dewatered, washed, and dried. The styrene/alpha-methyl styrene/acrylonitrile terpolymer, tested for haze as in Example I, exhibits a haze level of 2.7%.

EXAMPLE IV

Example III is repeated with the following exceptions:

(1) The 0.25 part of sodium chloride is omitted from the reaction vessel charge, and (2) 0.25 part of sodium sulfate is added to the reaction mixture at 30% conversion. The terpolymer has a haze level of 3.5%.

EXAMPLE V

A suitable reaction vessel is charged with 82 parts of styrene, 13 parts of acrylonitrile, 120 parts of water, 0.25 part of sodium chloride, 0.05 part of di-isopropylbenzene peroxide, and 0.1 part of di-t-butyl-p-cresol. This charge is deoxygenated by boiling in an inert atmosphere and then heated with agitation under inert gas pressure to polymerize monomers at a time-temperature cycle of 4 hours at 120° C. and 3.5 hours at 130° C. During the polymerization, the following additions are made to the reaction mixture:

(1) At 28% conversion—3 parts of a 1% aqueous solution of an acrylic acid-2-ethylhexyl acrylate copolymer having a combined acrylic acid content of 93.5–98.5 mol percent, and (2) Between 40 and 95% conversion—5 parts of acrylonitrile added continuously.

Polymerization is terminated at 97% conversion. Unreacted monomers are distilled from the product, which is then cooled, dewatered, washed, and dried. Tested for haze as in Example I, the copolymer exhibits a haze level of 4%.

Control A

Control A demonstrates the criticality of including a water-soluble inorganic salt in the aqueous phase during suspension copolymerization of the monovinylidene aromatic hydrocarbon and unsaturated nitrile.

Example III is repeated with the exception that the 0.25 part of sodium chloride is omitted from the reaction vessel charge. The terpolymer formed by this reaction in the absence of a water-soluble inorganic salt has a haze of 34%, compared with the 2.7% haze of the terpolymer of Example III and the 3.5% haze of the terpolymer of Example IV.

Control B

Control B demonstrates the criticality of reserving a portion of the more rapidly-consumed monomer for late addition to the reaction mixture in order to maintain a substantially constant monomer ratio.

Example I is repeated with the exception that the 10 parts of styrene added between 40 and 90% conversion in that example are included in the initial reaction vessel charge. The copolymer thus prepared has a haze of 7%, compared with the 5% haze of the copolymer of Example I.

When Example III is repeated with the exception that the 10 parts of styrene added between 40 and 90% conversion in that example are included in the initial reaction vessel charge, the terpolymer formed by the reaction exhibits a haze level of 5%, compared with the 2.7% haze level of the terpolymer of Example III.

Control C

Control C demonstrates the criticality of adding the water-soluble suspending agent to the reaction mixture at a stage of the reaction between 20 and 40% conversion.

Example I is repeated with the exception that the suspending agent is included in the initial reaction vessel charge instead of being added at 26% conversion. The copolymer thus prepared has a haze of 21%, compared with the 5% haze of the copolymer of Example I.

Control D

Control D demonstrates the criticality of terminating the copolymerization reaction at a conversion of 95–98%.

Example I is repeated with the exception that the copolymerization is carried to 99.1% conversion instead of being terminated at 98% conversion. This control copolymer has a haze of 11%, compared with the 5% haze of the copolymer of Example I.

The process of the invention is a method of copolymerizing at least one monovinylidene aromatic hydrocarbon and an unsaturated nitrile of the group consisting of acrylonitrile, methacrylonitrile, and mixtures thereof by a modified aqueous suspension polymerization technique wherein (1) copolymerization is initiated in the absence of a suspending agent, (2) a water-soluble suspending agent is added to the reaction mixture at a stage of the reaction between 20 and 40% conversion of monomers to polymer, (3) a water-soluble inorganic salt is added to the reaction mixture prior to the stage of 65% conversion, (4) the monomer ratio in the reaction mixture is maintained substantially constant by adding supplemental amounts of the more rapidly-consumed monomer between 30 and 95% conversion, (5) the copolymerization reaction is terminated at 95–98% conversion, and (6) unreacted monomers are then removed by distillation.

The invention is applicable to the copolymerization of 5–95 parts by weight of at least one monovinylidene aromatic hydrocarbon, e.g., styrene, alpha-alkyl styrenes such as alpha-methyl styrene, ar-alkyl styrenes such as the o-, m-, and p-methyl styrenes, vinyl naphthalene, etc., and correspondingly, 95–5 parts by weight of an unsaturated nitrile of the group consisting of acrylonitrile, methacrylonitrile, and mixtures thereof. Preferably, about 70–90 parts by weight of the monovinylidene aromatic hydrocarbon are copolymerized with about 30–10 parts by weight of the unsaturated nitrile.

The process of the invention, with the exception of including the combination of critical steps constituting the point of novelty of the invention, is conducted by conventional aqueous suspension polymerization techniques. Thus, the monomers are copolymerized with agitation in an inert atmosphere in the presence of catalytic amounts of a free radical-generating polymerization initiator such as a peroxy or azo compound, e.g., benzoyl peroxide, di-t-butyl peroxide, di-isopropylbenzene peroxide, t-butyl peracetate, azoisobutyronitrile, etc., at temperatures in the range of 30–200° C., preferably about 50–150° C., under atmospheric or superatmospheric pressure. The amount of water employed is such that the water/monomer ratio is in the range of 9:1 to 2:3. Usually, the reaction mixture contains a chain transfer agent, e.g., alpha-methyl styrene dimer, a higher alkyl mercaptan such as t-dodecyl mercaptan, etc., to regulate the molecular weight of the copolymer.

In the process of the invention, conventional aqueous suspension polymerization techniques are modified to improve the optical clarity of styrene-acrylonitrile type copolymers prepared by such processes. This modification includes, in combination, the inclusion of a water-soluble inorganic salt in the aqueous phase of the reaction mixture prior to the stage of about 65% conversion, the addition of a water-soluble suspending agent to the reaction mixture at a stage of the reaction between 20 and 40% conversion of monomers to polymer, the addition of supplemental amounts of the more rapidly-consumed monomer between 30 and 95% conversion to maintain a substantially constant monomer ratio in the reaction mixture, and the termination of the polymerization reaction at 95–98% conversion.

Water-soluble inorganic salts suitable for use in the practice of the invention include, e.g., metal halides and sulfates such as sodium chloride, sodium sulfate, calcium chloride, magnesium sulfate, aluminum chloride, and the like. The inorganic salt should be employed in an amount in the range of 0.05–1%, based on the weight of the monomer mixture, which amount is insufficient to cause precipitation of the water-soluble suspending agent. It can be added to the reaction mixture prior to the initiation of copolymerization or, alternatively, can be added during the reaction at a stage prior to about 65% conversion. When the product is to be used in an application in which it will be exposed to an aqueous medium for prolonged periods, it is usually preferable to add the inorganic salt at the same time as or after the suspending agent in order to improve the degree of optical clarity retained by the product after a period of exposure to water.

The suspending agent added to the reaction mixture at 20–40% conversion, preferably at 25–30% conversion, can be any of the water-soluble organic materials conventionally employed as suspending agents in bead polymerization processes, e.g., polyvinyl alcohol, acrylic acid polymers and copolymers, cellulose ethers, etc.

According to a preferred embodiment of the invention, the suspending agent is a copolymer of 93.5–98.5 mol percent of an unsaturated acid of the group consisting of acrylic acid, methacrylic acid, and mixtures thereof and 6.5–1.5 mol percent of an unsaturated ester of the group consisting of 2-ethylhexyl acrylate, 2-ethylhexyl methacrylate, and mixtures thereof. Such copolymeric suspending agents, described in U.S. Patent 2,945,013, issued July 12, 1960, are usually employed in amounts in the range of 0.005–2% preferably 0.01–0.5%, based on the weight of the water in the reaction mixture.

The addition of supplemental amounts of the more rapidly-consumed monomer can be continuous or intermittent and is made between 30 and 95% conversion, preferably 40–90% conversion. Although addition of liquids to a polymerizing styrene suspension usually has been found to result in bead agglomeration, this addition of supplemental monomer in the process of the invention surprisingly has no adverse effect on suspension stability.

As already known to those skilled in the art, the reaction rates of the monovinylidene aromatic hydrocarbon and unsaturated nitrile vary with the monomer ratios. Thus, styrene is consumed more rapidly than acrylonitrile when the styrene-acrylonitrile monomer mixture contains more than 24% by weight of acrylonitrile, and acrylonitrile is consumed more rapidly than styrene when the monomer mixture contains less than 24% acrylonitrile. Consequently, the amount of each of the monomers which should be included in the initial reaction mixture and the amount of the more rapidly-consumed monomer which should be reserved for late addition to the reaction mixture in order to maintain a substantially constant monomer ratio vary with the particular copolymer being prepared. These amounts can be easily calculated from the reaction rate constants of the monomers as taught, e.g., by Flory, "Principles of Polymer Chemistry," Cornell University Press, Ithaca, New York (1953), Chapter V, particularly page 179.

After termination of the reaction at 95–98% conversion, unreacted monomers are removed by distillation. The product is then cooled, dewatered, washed, and dried as in conventional suspension polymerization processes.

The invention is advantageous in that it provides for suspension-polymerized styrene-acrylonitrile type copolymers having low haze levels, in contrast to the high haze levels of about 50–55% which characterize the copolymers prepared by suspension polymerization processes in which none of the critical steps of the present invention is included. As demonstrated by Controls A–D, elimination of any of these critical steps results in increasing the haze level of the copolymers. Thus, it is only by including the combination of critical steps that the suspension-polymerized copolymers having a minimum of haze can be prepared.

Because of their low haze levels, the copolymers prepared by the process of the invention are particularly useful in molding, film, and sheet applications wherein optical clarity is a prerequisite. However, they are also useful in applications wherein the suspension-polymerized styrene-acrylonitrile type copolymers of the prior art have been employed. In addition to their better clarity, the copolymers prepared by the process of the invention appear to have better thermal stability and mechanical properties.

The copolymers can be compounded with additives such as fillers, plasticizers, antioxidants, other polymers, colorants, etc., if desired.

It is obvious that many variations may be made in the products and processes set forth above without departing from the spirit and scope of this invention.

What is claimed is:

1. In a process for copolymerizing 5–95 parts by weight of a monovinylidene aromatic hydrocarbon and, correspondingly, 95–5 parts by weight of an unsaturated nitrile of the group consisting of acrylonitrile, methacrylonitrile, and mixtures thereof in an aqueous system in the presence of a free radical-generating polymerization initiator and a suspending agent, the improvement which comprises (1) initiating copolymerization of the monovinylidene aromatic hydrocarbon and unsaturated nitrile monomers in the absence of a suspending agent, (2) continuing copolymerization in the absence of a suspending agent until 20–40% of the monomers have been converted to polymer, (3) adding a water-soluble suspending agent to the reaction mixture at a stage of the reaction between 20 and 40% conversion, (4) adding 0.05–1% of a water-soluble inorganic salt, based on the weight of the monomers, to the reaction mixture prior to the stage of about 65% conversion, (5) maintaining a substantially constant monomer ratio in the reaction mixture by adding supplemental amounts of the more rapidly-consumed monomer between 30 and 95% conversion, (6) terminating the copolymerization reaction at 95–98% conversion, and (7) removing unreacted monomers by distillation.

2. A process as in claim 1 wherein the copolymerization is initiated in the presence of the water-soluble inorganic salt.

3. A process as in claim 1 wherein the water-soluble inorganic salt is added to the reaction mixture between the time of the addition of the suspending agent and the stage of about 65% conversion.

4. A process as in claim 1 wherein the monovinylidene aromatic hydrocarbon is styrene.

5. A process as in claim 1 wherein the monovinylidene aromatic hydrocarbon is a mixture of styrene and alpha-methyl styrene.

6. A process as in claim 1 wherein the monovinylidene aromatic hydrocarbon is styrene and the unsaturated nitrile is acrylonitrile.

7. A process as in claim 1 wherein the water-soluble inorganic salt is sodium chloride.

8. A process as in claim 1 wherein the water-soluble inorganic salt is sodium sulfate.

9. A process as in claim 1 wherein the water-soluble suspending agent is a copolymer of 93.5–98.5 mol percent of an unsaturated acid of the group consisting of acrylic acid, methacrylic acid, and mixtures thereof and 6.5–1.5 mol percent of an unsaturated ester of the group consisting of 2-ethylhexyl acrylate, 2-ethylhexyl methacrylate, and mixtures thereof.

10. In a process for copolymerizing 70 parts by weight of styrene and 30 parts by weight of acrylonitrile in an aqueous system in the presence of a free radical-generating polymerization initiator and a suspending agent, the improvement which comprises (1) initiating copolymerization of 60 parts by weight of styrene and 30 parts by weight of acrylonitrile in the absence of a suspending agent and in the presence of 0.25 part by weight of sodium chloride, (2) continuing copolymerization in the absence of a suspending agent until 25–30% of the monomers have been converted to polymer, (3) adding 0.03 part by weight of a copolymer of 93.5–98.5 mol percent of an unsaturated acid of the group consisting of acrylic acid, methacrylic acid, and mixtures thereof and 6.5–1.5 mol percent of an unsaturated ester of the group consisting of 2-ethylhexyl acrylate, 2-ethylhexyl methacrylate, and mixtures thereof to the reaction mixture as a suspending agent at a stage of the reaction between 25 and 30% conversion, (4) adding an additional 10 parts by weight of styrene to the reaction mixture between 40 and 90% conversion, (5) terminating the copolymerization reaction at 95–98% conversion, and (6) removing unreacted monomers by distillation.

References Cited by the Examiner

UNITED STATES PATENTS 3,051,682  8/62  Ott _____ 260—85.5

FOREIGN PATENTS 230,867  10/60  Australia.

JOSEPH L. SCHOFER, *Primary Examiner.*

LOUISE P. QUAST, LEON J. BERCOVITZ,
*Examiners.*